(12) United States Patent
Ikeda

(10) Patent No.: US 7,891,545 B2
(45) Date of Patent: Feb. 22, 2011

(54) INFORMATION RECORDING MEDIUM AND INFORMATION READING DEVICE

(75) Inventor: Masahiro Ikeda, Nagano (JP)

(73) Assignee: Nidec Sankyo Corporation (JP)

( * ) Notice: Subject to any disclaimer, the term of this patent is extended or adjusted under 35 U.S.C. 154(b) by 689 days.

(21) Appl. No.: 11/814,859

(22) PCT Filed: Jan. 25, 2006

(86) PCT No.: PCT/JP2006/301134

§ 371 (c)(1),
(2), (4) Date: Jul. 26, 2007

(87) PCT Pub. No.: WO2006/080343

PCT Pub. Date: Aug. 3, 2006

(65) Prior Publication Data

US 2009/0008453 A1    Jan. 8, 2009

(30) Foreign Application Priority Data

Jan. 26, 2005   (JP) .............................. 2005-018947
Feb. 1, 2005    (JP) .............................. 2005-025199

(51) Int. Cl.
*G06F 17/00* (2006.01)
(52) U.S. Cl. ...................................... 235/375; 235/487
(58) Field of Classification Search ................. 235/375, 235/380, 382, 382.5, 487
See application file for complete search history.

(56) References Cited

U.S. PATENT DOCUMENTS

2005/0018873 A1*  1/2005  Rhoads ....................... 382/100

FOREIGN PATENT DOCUMENTS

| JP | 6-311333 A   | 11/1994 |
| JP | 8-305816     | 11/1996 |
| JP | 2001-52142   | 2/2001  |
| JP | 2003-271942  | 9/2003  |
| WO | 92/21100 A1  | 11/1992 |

OTHER PUBLICATIONS

International Search Report for International Application No. PCT/JP2006/301134 dated Apr. 25, 2006.

* cited by examiner

*Primary Examiner*—Karl D Frech
(74) *Attorney, Agent, or Firm*—Cantor Colburn LLP

(57) ABSTRACT

An information recording medium is disclosed. The information recording medium may belong to a holder and may be used with an information reading device. The information recording medium may include a read area from which information may be read. The read area may include an encoded information unit which contains encoded information of the holder of the information recording medium and a characteristic unit which contains visual characteristics of the holder of said information recording medium.

19 Claims, 10 Drawing Sheets

INFORMATION RECORDING MEDIUM AND INFORMATION READING DEVICE

CROSS REFERENCE TO RELATED APPLICATIONS

This is a U.S. national stage of application No. PCT/JP2006/301134, filed on 25 Jan. 2006. Priority under 35 U.S.C. §119(a) and 35 U.S.C. §365(b) is claimed from Japanese Application No. 2005-018947, filed 26 Jan. 2005, and from Japanese Application No. 2005-025199, filed 1 Feb. 2005, the disclosures of which are also incorporated herein by reference.

FIELD OF THE INVENTION

The present invention relates to an information recording medium made of paper or plastic, on which predetermined information is recorded, and also relates to an information reading device that reads information recorded on the information recording medium.

BACKGROUND OF THE INVENTION

Conventionally there are information recording media such as driver's licenses, cash cards and credit cards, on which various kinds of personal information are recorded. To record personal information on an information recording medium, a magnetic strip, an IC chip, or a barcode is used. Among these, a barcode records personal information most easily and least expensively. Barcodes are widely used in various areas including the product distribution field; for example, a so-called PDF 417, stack-type encoded barcode is used for US driver's licenses. Note that two-dimensional barcodes in which the amount of information is increased by stacking one-dimensional barcodes have become widespread in recent years.

There are various methods to read personal information recorded in two-dimensional barcodes. For example, in one method, a subject (two-dimensional barcode) is imaged by a camera having a two-dimensional image sensor installed, and the obtained two-dimensional image data is analyzed to read personal information; in another method, a subject (a two-dimensional barcode) placed on a glass is optically read from the other side [of the glass] by a flat bed scanner. However, since the above-mentioned methods require expensive machines and spacious installation environments, they are not suitable for cash registers in department stores or personal uses, for example. Therefore, a swipe-type information reading device, in which the edge of a card is held by hand (held by fingers) and the card is swiped to read information recorded in the two-dimensional barcode, has been widely used at cash registers or for personal uses.

Among information recording media, there are cards on which not only a two-dimensional barcode is printed but also a portrait photo is placed. For example, on the plastic card 100 shown in FIG. 12, a two-dimensional barcode 101 is printed at the bottom and a portrait 102 is placed in the upper left-hand corner. Another example is the ID card disclosed in Patent reference 1 (see FIG. 5 of Patent reference 1), on which a barcode (portrait contents code) is printed at the bottom and an upper-body photograph is placed on the left side.

Cards having visual characteristics such as a portrait, fingerprint, or signature increase their security and reliability. For example, a portrait is placed on the card, and the characteristics of the portrait (the center positions and sizes of eyes, mouth and nose, etc.) are encoded and embedded in a two-dimensional barcode. In this way, even when the portrait is replaced with that of someone else's, the two-dimensional barcode and the replaced portrait are optically read and the characteristics of the [replaced] portrait and the characteristics of the portrait that are embedded in the two-dimensional barcode are simply compared to each other to prevent forgery.
[Patent Reference 1] Japanese Unexamined Patent Publication (Tokkai) No. 2001-52142 (FIG. 5)

However, even with a card that contains a two-dimensional barcode and a portrait to prevent forgery, when information on the card is read by a swipe-type information reading device that is used at cash registers or for personal uses, geometric distortion may be caused, resulting in deteriorated reading accuracy.

In other words, since the human operation of holding the edge of an information recording medium is involved for the swipe-type (manual type) information reading device, the information recording medium may not be swiped at a constant speed. If that's the case, jitter in the transporting direction is caused to image data recorded in the information reading device. As a result, the two-dimensional barcode image and the portrait image are distorted, deteriorating reading accuracy. Note that such a problem can occur even in an automatic information reading device if the transporting speed is changed due to breakdown of the device in the midst of transporting the card with a motor.

When a two-dimensional image sensor or flat bed scanner other than a swipe-type information reading device is used at cash registers or for personal uses, the human operation of swiping is not necessary; therefore, the two-dimensional barcode image or portrait image will not be distorted. However, as described above, these devices increase cost and require spacious installation environments, and thus they have many factors to prevent their widespread use in the market. For these reasons, there is a need for cards in which, even when the two-dimensional barcode image and/or portrait image are distorted, the distortion can be corrected.

SUMMARY OF THE INVENTION

At least an embodiment of the present invention is devised considering the above problems, and it may provide an information recording medium and an information reading device in which a two-dimensional barcode and visual characteristics such as a portrait can be optically read altogether by information reading devices, and security and reliability of the information recording medium can be improved and usability can be increased. At least an embodiment of the present invention may provide an information recording medium and an information reading device in which, even when geometric distortion is caused when the two-dimensional barcode and visual information (characteristics) such as a portrait is optically read, the distortion can be easily corrected, contributing to improvement of reading accuracy.

At least an embodiment of the present invention may provide an information reading device that can read a two-dimensional barcode, visual characteristics such as a portrait, and a mark used to correct the geometric distortion caused when optically reading the visual information, altogether by a single reading operation, contributing to improvement of reading accuracy and improving security and reliability of the information recording medium and increasing its usability.

At least an embodiment of the present invention is featured by the fact that the information recording medium used with the information reading device has a read area from which information is read by the information reading device, and the read area includes an encoded information unit that contains encoded information of the holder of the information recording medium and a characteristic unit that contains visual characteristics of the holder of the information recording medium.

According to at least an embodiment of the present invention, the information recording medium used with an information reading device has a read area from which information is read by the information reading device, and the read area includes an encoded information unit that contains encoded information of the holder of the information recording medium and a characteristic unit that contains visual characteristics such as a portrait, fingerprint or signature of the holder of the information recording medium. Therefore, unlike conventional cards, not only the encoded information unit such as a two-dimensional barcode, but also a characteristic unit such as a portrait is included in the read area.

Conventionally, when a two-dimensional barcode and visual characteristics such as a portrait are optically read altogether, an expensive device such as a two-dimensional image sensor or a flat bed scanner is required which in turn requires spacious installation environments. However, according to at least an embodiment of the present invention, as long as a manual-type (swipe-type) information reading device is used which has been widely used at cash registers or for personal uses, the information can be optically read altogether (by a one-time swipe) without requiring the above-mentioned expensive device, thus increasing usability of the information recording medium.

Here, the "encoded information unit that contains encoded information of the holder of the information recording medium" can be a one-dimensional barcode or a two-dimensional barcode (stack-type or matrix-type), but also includes all codes that contain encoded predetermined information (personal information, especially). Also, "the encoded information unit" may contain information other than "the encoded information of the holder of the information recording medium". Note that "encoded information of the holder of the information recording medium" can be a name, address, phone number, date of birth, family, account number, etc.

Also, "a characteristic unit that contains visual characteristics of the holder of the information recording medium" may be a portrait, fingerprint, or signature; however, anything can be used as long as it can be recognized by its visual characteristics.

In at least an embodiment of the present invention, the encoded information unit contains information in which the extracted information of the visual characteristics in the characteristic unit is encoded.

According to at least an embodiment of the present invention, the above-mentioned encoded information unit contains information in which the extracted information of the visual characteristics in the characteristic unit is encoded; therefore, security and reliability can be improved.

More specifically, because information in which the extracted information of visual characteristics such as eyes, nose, etc. of the portrait is encoded, is embedded in the encoded information unit in advance, even when the visual characteristics placed on the information recording medium are replaced with those of someone else's, the replaced visual characteristics and the visual characteristics which are embedded in the encoded information unit in advance are compared with each other to prevent forgery, resulting in improved security and reliability.

Even when the encoded information unit is altered, a comparison can be made in the same manner to prevent forgery. Thus, according to at least an embodiment of the present invention, it can be determined whether or not the encoded information unit and the characteristic unit match; therefore, a secure information recording medium can be provided.

In at least an embodiment of the present invention, it is preferred that the read area include a mark unit that contains a mark used for correcting geometric distortion which is caused when the visual characteristics in the characteristic unit are optically read by the information reading device.

According to at least an embodiment of the present invention, the above-mentioned read area includes a mark unit that contains a mark used for correcting geometric distortion which is caused when visual characteristics in the characteristic unit are optically read by the information reading device; therefore, image distortion caused by jitter in the transporting direction can be corrected.

More specifically described, when visual characteristics such as a portrait, fingerprint or signature are placed in the above-mentioned read area, jitter in the transporting direction caused by inconsistent swiping may cause distortion to the portrait, fingerprint or signature; however, according to at least an embodiment of the present invention, based on the correction information which is obtained by optically reading the above-mentioned mark unit, the distortion can be corrected.

The position of the mark unit in the read area is not specified. For example, it may be positioned adjacent to the encoded information unit or may be positioned inside the encoded information unit. With this, when the encoded information unit is optically read by the information reading device, image distortion caused by jitter in the transporting direction can be corrected. In particular, barcodes other than the PDJ417 code type are easily affected by jitter in the transporting direction; however, according to at least an embodiment of the present invention, a negative influence by jitter can be reduced.

Also, it is preferred that the mark unit be positioned adjacent to the characteristic unit.

According to at least an embodiment of the present invention, the above-mentioned mark unit is positioned adjacent to the characteristic unit; therefore, the mark unit and the characteristic unit are moved simultaneously at the same speed when passing the front of an image sensor during the swiping. As a result, accuracy in correcting image distortion caused by jitter in the transporting direction can be improved in the information reading device.

Also, it is preferred that the encoded information unit contain information in which the extracted information of the visual characteristics in the characteristic unit and the extracted information of the characteristics of the mark unit are encoded.

According to at least an embodiment of the present invention, the above-mentioned encoded information unit contains information in which the extracted information of the visual characteristics in the characteristic unit and the extracted information of the characteristics of the mark unit are encoded; therefore, even when the characteristic unit or the mark unit is altered (for example, the photo is replaced), the alteration can be appropriately detected, resulting in improved security and reliability.

Also, in at least an embodiment of the present invention, it is preferred that the mark unit have its width in the direction perpendicular to the transporting direction of the information recording medium in the information reading device, and also have a figure that varies its width with respect to the transporting direction.

According to at least an embodiment of the present invention, the mark unit has its width in the direction perpendicular to the transporting direction of the information recording medium in the information reading device, and also is in a figure that varies its width with respect to the transporting direction; thus, the mark unit is provided as continuous positional information. Therefore, the information needed to correct image distortion caused by jitter in the transporting direction can be retrieved at high resolution. Consequently, accuracy in correcting image distortion caused by jitter in the transporting direction can be improved.

In at least an embodiment of the present invention, it is preferred that the figure be arranged in multiple along the direction perpendicular to the transporting direction of the information recording medium in the information reading device, and the position phases of the multiple figures be shifted from each other in the transporting direction of the information reading medium in the information reading device.

According to at least an embodiment of the present invention, the figure is arranged in multiple along the direction perpendicular to the transporting direction of the information recording medium in the information reading device, and the position phases of the multiple figures are shifted from each other in the transporting direction of the information reading medium in the information reading device; therefore, even when the width of the figure in the direction perpendicular to the transporting direction in the information recording medium is made short to some extent and multiple figures, each of which has multiple segments, are provided concerning a layout on the information recording medium, the information needed to correct image distortion which is caused by jitter in the transporting direction can be retrieved accurately.

In at least an embodiment of the present invention, it is preferred that the encoded information unit be encrypted.

According to at least an embodiment of the present invention, the encoded information unit is encrypted; therefore, the extracted information of the visual characteristics in the characteristic unit cannot be retrieved from the encoded information unit, and thus forgery of the information recording medium can be prevented, keeping the information recording medium secure.

That the encoded information unit is "encrypted" means not only that the encoded information unit, in which the extracted information of visual characteristics in the characteristic unit are already encoded, is encrypted, but also that the extracted information of visual characteristics in the characteristic unit is encrypted in advance and the encrypted information is encoded in the encoded information unit.

Note that any kind of encryption method can be used. For example, for encryption in the encoded information unit in which the extracted information of visual characteristics in the characteristic unit is already encoded, various methods such as EAN/JAN, UPC, ITF, CODE39, CODE128, EAN128, NW-7 and Code 2 of 5 can be used. When the extracted information of visual characteristics in the characteristic unit is encrypted in advance and the encrypted information is encoded in the encoded information unit, various methods such as common key encryption, public key encryption, message authentication, digital signatures, or an electronic watermark embedded system can be used. Further, in the encoded information unit in which the extracted information of visual characteristics in the characteristic unit is already encoded, an encryption method such as common key encryption, public key encryption, message authentication, digital signatures, or an electronic watermark embedded system can be performed. Moreover, the subject to be encrypted may include all or part of "the encoded information of a holder" and the extracted information of visual characteristics in the characteristic unit.

In at least an embodiment of the present invention, it is preferred that the information reading device have a reading means that reads information recorded on the information recording medium.

According to at least an embodiment of the present invention, the information reading device has a reading means that reads information recorded on the information recording medium; therefore, a two-dimensional barcode and visual characteristics such as a portrait can be optically read altogether.

In at least an embodiment of the present invention, it is preferred that the information reading device have a frame that forms a [medium-] travel path, and a portion of the frame be formed as a travel reference plane along which the information recording medium is swiped to read information.

According to at least an embodiment of the present invention, in the information reading device in which a portion of the frame is formed as a travel reference plane along which the information recording medium is swiped to read information, a two-dimensional barcode and visual characteristics such as a portrait can be optically read altogether.

"Swipe" here means the operation in which an information recording medium such as a card is passed through the information reading device in a flash. The travel reference plane is the surface of the travel path that guides one side of the rectangular information recording medium along the transporting direction, and regulates inconsistent passing of the information recording medium. For example, when an information recording medium is swiped along the bottom portion of the frame of the information reading device, which is formed to have a substantially U-shaped cross-section, the bottom surface is used as the travel reference plane. With a dip-type information reading device, one of the surfaces parallel to the transporting direction of the information recording medium, which defines the travel path, is used as the travel reference plane, and the information recording medium may be pressed down to and swiped against the plane.

Further, at least an embodiment of the present invention features an information recording medium used with an information reading device that has a read area from which information is read by the information reading device, and the read area contains a mark, which is used when geometric distortion is caused when the surface of the information recording medium is optically read, for correcting the distortion with the information reading device.

According to at least an embodiment of the present invention, an information recording medium used with an information reading device has a read area from which information is read by the information reading device, and the read area contains a mark, which is used when geometric distortion (such as the distortion stretched in the transporting direction) is caused when a surface of the information recording medium (the surface on which a two-dimensional barcode or a portrait is printed, for example) is optically read, for correcting the distortion with the information reading device. Therefore, image distortion caused by jitter in the transporting direction can be corrected.

In other words, when a two-dimensional barcode, portrait, fingerprint or signature on the information recording medium is optically read by a swipe-type information reading device, jitter (i.e., geometric distortion) in the transporting direction may be caused by inconsistent swiping; however, according to at least an embodiment of the present invention, the distortion can be corrected, based on the distortion correction information obtained by optically reading the above-mentioned mark.

In this manner, at least an embodiment of the present invention can easily correct geometric distortion caused when the surface of the information recording medium is optically read, simply by providing (i.e., printing) a mark on the information recording medium in advance. Thus, reading accuracy can be easily improved.

The position of the "mark" in the read area is not specified. It may be positioned adjacent to the two-dimensional barcode or the portrait, or may be included inside the two-dimensional barcode or the portrait.

Also, the "mark" can be of any kind such as a line, frame, scribble figure, symbol or character, in any shape such as a straight line, triangle, square, rhodium, a plurality of parallel lines or bent lines, in any size taking up the entire read area, a half of the area or part of the area, and in any number such as 1, 2 or 3.

Note that the "information reading device" includes not only the swipe-type (manual-type) information reading device, but also an automatic information reading device. For example, even when the transporting speed is changed due to a certain accident in the midst of transporting the card with a motor, image distortion caused by jitter in the transporting direction can be corrected.

In at least an embodiment of the present invention, the mark has its width in the direction perpendicular to the transporting direction of the information recording medium in the information reading device, and is in the figure in which the width is varied with respect to the transporting direction.

According to at least an embodiment of the present invention, the above-mentioned mark has its width in the direction perpendicular to the transporting direction of the information recording medium in the information reading device, and is in the figure in which the width is varied with respect to the transporting direction; therefore, the mark is provided as continuous positional information with respect to the transporting direction so that the information needed to correct image distortion caused by jitter in the transporting direction can be retrieved at high resolution. Consequently accuracy in correcting image distortion caused by jitter in the transporting direction can be improved.

Also, in at least an embodiment of the present invention, it is preferred that the mark be composed of a plurality of figures arranged parallel to the direction perpendicular to the transporting direction of the information recording medium in the information reading device, and the position phases of the plurality of figures be shifted from each other in the transporting direction of the information recording medium in the information reading device.

According to at least an embodiment of the present invention, the above-mentioned mark is composed of a plurality of figures which are arranged along the direction perpendicular to the transporting direction of the information recording medium in the information reading device, and the position phases of the plurality of figures are shifted from each other in the transporting direction of the information recording medium in the information reading device. Therefore, even when the width of the mark in the direction perpendicular to the transporting direction of the information recording medium is shortened to some extent and a plurality of figures, each of which has a plurality of segments, are provided concerning a layout on the information recording medium, the information needed to correct image distortion which is caused by jitter in the transporting direction can accurately be retrieved by the information reading device. For example, even when one of the mark figures is locally curved because of jitter in the transporting direction, the necessary information to correct image distortion can accurately be retrieved from another figure for which the position phase is shifted.

Note that it is preferred that two figures be arranged in the read area in the information recording medium such that they are arranged side by side in the direction perpendicular to the transporting direction of the information recording medium in the information reading device and the position phases thereof are shifted from each other in the transporting direction of the information recording medium in the information reading device. In this way, the necessary information to correct the above-mentioned distortion can accurately be retrieved at minimum printing cost.

In at least an embodiment of the present invention, it is preferred that the read area include an encoding information unit that contains the encoded information of the holder of the information recording medium, and the mark be provided adjacent to or inside the encoded characteristic unit.

According to at least an embodiment of the present invention, the read area includes an encoding information unit, such as a two-dimensional barcode, that contains the encoded information of the holder of the information recording medium, and the mark is located adjacent to or inside the encoded characteristic unit; therefore, accuracy in correcting image distortion caused by jitter in the transporting direction can be increased in the encoded information unit.

In other words, barcodes other than the encoded type such as PDF417 are easily affected by jitter in the transporting direction; however, since the above-mentioned mark is arranged adjacent to the barcode in at least an embodiment of this invention, the barcode and the mark pass the front of the image pickup device such as a sensor at the same time; as a result, accuracy in correcting image distortion caused by jitter in the transporting direction can be increased.

In at least an embodiment of the present invention, it is preferred that the read area include a characteristic unit that contains visual characteristics of the holder of the information recording medium, and the mark be arranged adjacent to or inside the characteristic unit.

According to at least an embodiment of the present invention, the above-mentioned read area includes a characteristic unit that contains visual characteristics (the positions of nose and eyes, for example) of a portrait, fingerprint, or signature of the holder of the information recording medium, and the above-mentioned mark is arranged adjacent to or inside the characteristic unit; therefore, accuracy in correcting image distortion caused by jitter in the transporting direction can be increased in the same manner as the mark is arranged adjacent to or inside the encoded information unit.

Note that the mark may be arranged in a predetermined position in the encoded information unit or the characteristic unit to eliminate any awkwardness that arranging it in the read area of the information recording medium may cause. For example, a mark may be embedded in a portion of the two-dimensional barcode or on a frame of the portrait such that it will not be recognized as the mark used for correcting the distortion (i.e., a portion of the two-dimensional barcode or a frame of the portrait is used as the mark). Or a mark itself may be of a figure that surrounds the personal figure in the portrait. By forming a mark in a figure that cannot be recognized as the mark used for correcting the distortion, any awkwardness caused by arranging the mark in the read area of the information recording medium can be eliminated.

In at least an embodiment of the present invention, it is preferred that the information reading device be equipped with a distortion correcting means that corrects the distortion based on the mark on the surface of the information recording medium.

According to at least an embodiment of the present invention, the information reading device is equipped with a distortion correcting means that corrects the distortion based on the mark on a surface of the information recording medium; therefore, the information reading device that can accurately correct image distortion caused by jitter in the transporting direction can be provided.

In at least an embodiment of the present invention, it is preferred that the information reading device have a frame that forms a medium-travel path and a portion of the frame be formed as a travel reference plane along which an information recording medium is swiped to read information.

According to at least an embodiment of the present invention, in the information reading device in which a portion of the frame is formed as a travel reference plane along which an information recording medium is swiped for information to be read, image distortion caused by jitter in the transporting direction can accurately be corrected.

Further, at least an embodiment of the present invention is featured by the fact that, in an information reading device that reads information from a medium containing a read area from which the information is read, the read area includes an encoded information unit that contains the encoded information of the holder of the information recording medium and a characteristic unit that contains visual characteristics of the holder of the information recording medium, and the encoded information unit and the characteristic unit are read by a single reading operation.

The "single reading operation" means the operation which gives an information recording medium access to the information reading device, that is, the operation which moves the medium relative to the reading device in one direction. For example, manual access includes a swipe-type device and a dip-type device by which a medium is inserted in a predetermined direction. Also, the operation may consist of transporting a medium in one direction with the drive of the reading device or of moving the read means of the reading device with respect to the medium.

According to at least an embodiment of the present invention, in an information reading device that reads information from a medium containing a read area from which the information is read, the information recording medium is provided with a read area which includes an encoded information unit that contains the encoded information of the holder of the information recording medium (such as a two-dimensional barcode) and a characteristic unit that contains visual characteristics of the holder of the information recording medium (such as a portrait, fingerprint or signature), and the encoded information unit and the characteristic unit are read by a single reading operation. Therefore, usability of the information recording medium can be increased. In other words, according to the manual-type (swipe-type) information reading device that has been widely used at cash registers or for personal uses, the encoded information unit and the characteristic unit can be read by a single reading operation that optically reads information altogether with a one-time swipe.

To optically read a two-dimensional barcode and visual characteristics such as a portrait altogether conventionally, a two-dimensional image sensor or a flat bed scanner is needed which requires spacious installation environments and is very expensive; however, according to at least an embodiment of the present invention, such an expensive device is not necessary.

In at least an embodiment of the present invention, it is preferred that the read area be provided with a mark which is used when geometric distortion is caused when the characteristic unit of the information recording medium is optically read, and the mark be read by the single reading operation that also reads the encoded information unit and the characteristic unit.

According to at least an embodiment of the present invention, the read area is provided with a mark which is used when geometric distortion is caused when the characteristic unit of the information recording medium is optically read, and the mark is read by a single reading operation that reads the encoded information unit and the characteristic unit; therefore, image distortion caused by jitter in the transporting direction can be corrected.

In other words, when a visual characteristic such as a portrait, fingerprint or signature is on the above-mentioned read area, jitter may be caused in the transporting direction because of inconsistent swiping and then the portrait, fingerprint or signature may be distorted; however, according to at least an embodiment of the present invention, the distortion can be corrected based on the correction information obtained by optically reading the above-mentioned mark.

Further, according to at least an embodiment of the present invention, by a manual-type (swipe-type) information reading device widely used at cash registers or for personal uses, the mark unit can be optically read together with the encoded information unit and the characteristic unit by a single reading operation of a one-time swipe. Therefore, there is no need to use an expensive device such as a two-dimensional image sensor or a flat bed scanner that requires spacious installation environments, but the distortion can be corrected based on the correction information obtained by optically reading the above-mentioned mark unit by a one-time swipe. This increases usability of the information recording medium.

The information recording medium and the information reading device of at least an embodiment of the present invention are designed so that the two-dimensional barcode and the visual characteristic such as a portrait on the information recording medium can be optically read altogether in the information reading device, resulting in improved security and reliability of the information recording medium and increasing its usability.

Even when geometric distortion is caused when a two-dimensional barcode and a visual characteristic such as a portrait is optically read by the information reading device, the distortion can be easily corrected, resulting in improved reading accuracy.

Further, in at least an embodiment of the present invention, the two-dimensional barcode, the visual characteristic such as a portrait, and the mark used to correct geometric distortion which is caused when the visual characteristic is optically read, can be read altogether by a single reading operation, easily contributing to improvement of reading accuracy and resulting in improvement of security and reliability of the information recording medium and increasing its usability.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF PREFERRED EMBODIMENTS

Figure 1A:
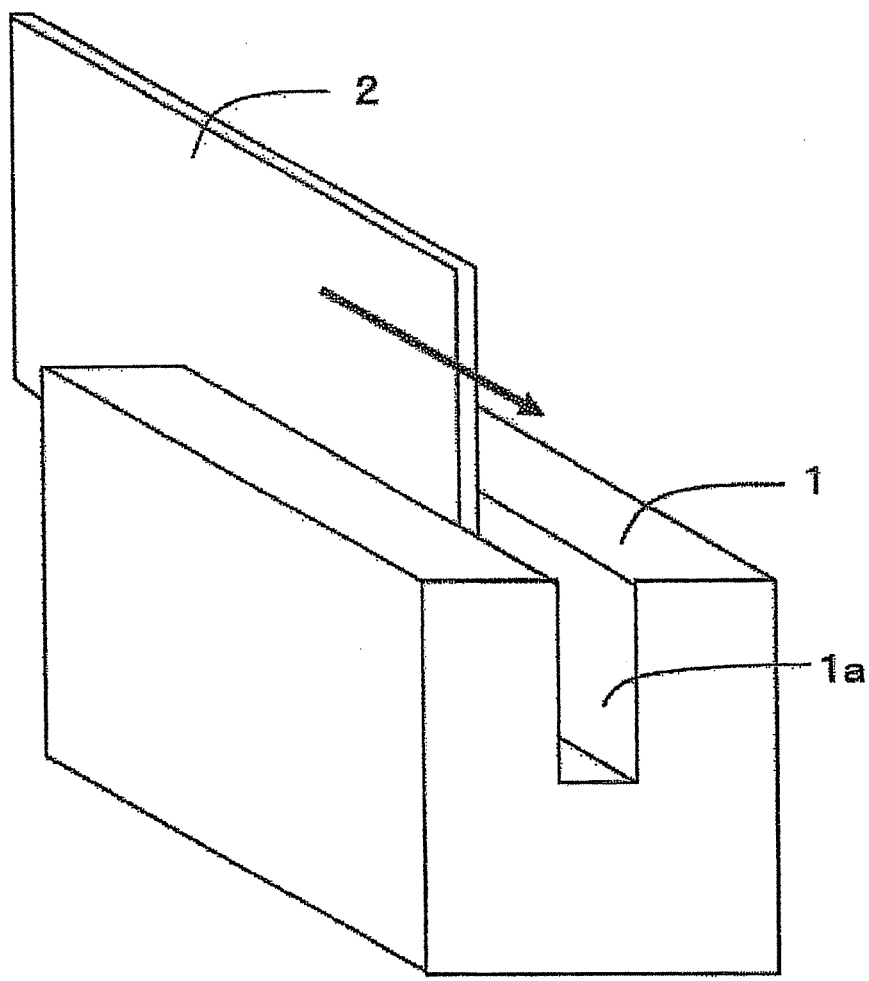
FIGS. 1(a) and 1(b) are diagrams showing an exterior configuration of a swipe-type image scanner and a card of one embodiment of the present invention.

Best forms of at least an embodiment of the present invention are described hereinafter referring to the drawings.

First Embodiment

Configuration

Figure 1B:
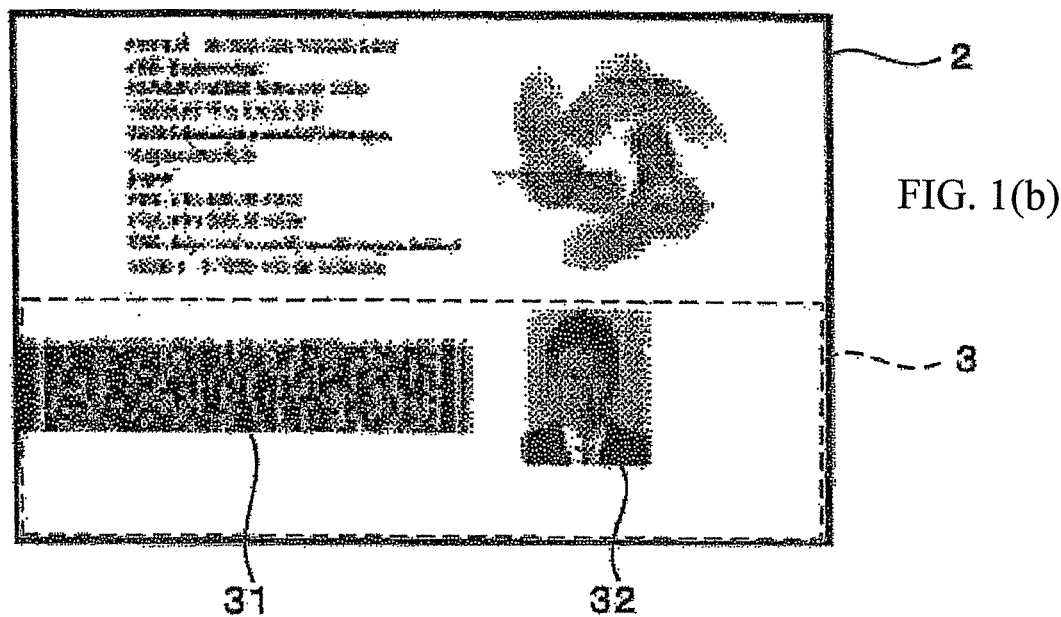

FIGS. 1(a) and 1(b) are diagrams showing the exterior configuration of a swipe-type image scanner 1 and a card 2 of the first embodiment of the present invention. FIG. 1 (a) shows that the card 2 is passed through the swipe-type image scanner; FIG. 1 (b) is the card 2, enlarged and seen from the front.

In FIG. 1 (a), the swipe-type image scanner 1 has a frame having a substantially U-shaped cross-section, and the bottom portion of the frame is formed as a card-traveling reference plane. Also, a card path 1a is formed between two side walls opposed to each other interposing the bottom portion between them. Note that the electrical configuration of the swipe-type image scanner 1 will be described later.

In FIG. 1 (b), the card 2 is a normal JIS-based card, which is a plastic card having a width of 86 mm, a height of 54 mm and a thickness of 0.76 mm, for example. Note that, although a plastic card is used in this embodiment, any cards may be used such as a paper card like a stamp card, an IC card with a built-in IC chip, or a rewrite card which has a special coating applied on the card surface to enable the rewriting of information. Also, the card can be of any size. Further, information recording media such as a subject to POS terminal, a booklet like a passport, any card having the size of a credit card, name card, or boarding pass can be used.

The card 2 has a read area from which information is read by the swipe-type image scanner 1. The read area 3 includes a two-dimensional barcode 31 that contains the encoded information of the holder of the card 2 and a portrait 32 showing the visual characteristics of the holder of the card 2. The two-dimensional barcode 31 is created by extending a one-dimensional barcode; for example, information is converted (i.e., encoded) into a two-dimensional code by software or hardware, and the two-dimensional code is printed on the card 2 by a printer.

Note that, although the portrait 32 is placed on the right side of the two-dimensional barcode here, it can be placed anywhere as long as it is inside the read area 3. In FIG. 1 (b), the read area 3 takes up about the bottom half (½) of the card; however, it can occupy any portion of the card such as ⅓ or ⅔ of the card from the bottom. Further, the read area 3 may be provided in the vertical direction (the top-to-bottom direction) of FIG. 1 (b) for some cases.

Since the two-dimensional barcode 31 that contains the encoded information (such as name and address) of the holder of the card 2 and the portrait 32 showing visual characteristics (such as eyes, nose or mouth) of the holder of the card 2 are arranged inside the read area 3 as shown in FIG. 1 (b), the two-dimensional barcode 31 and the portrait 32 can be optically read altogether (by a one-time swipe), i.e., by a single reading operation. Consequently usability of the card 2 can be increased.

There is a case in which the two-dimensional barcode 31 contains the encoded information of the center position and/ or the size of the eyes, nose, or mouth which the portrait 32 has. In this way, even when the portrait 32 on the card 2 is replaced with that of someone else, the characteristics of the portrait of someone else and the characteristic of the portrait contained in the two-dimensional barcode 31 are compared to each other to prevent forgery, resulting in improved security and reliability of the card.

Furthermore, the two-dimensional barcode 31 can not only be one that is simply encoded, but also one that is also encrypted. In other words, encryption such as UPC, ITF or CODE 39 can be performed on the two-dimensional barcode 31 in which the extracted information of the visual characteristics of the portrait 32 (such as the size and position of the eyes and nose) is already encoded. In this way, a more secure information recording medium can be provided.

Also, the extracted information of the visual characteristics of the portrait 32 (the size and position of the eyes and nose) is encrypted in advance, and then the encrypted information may be encoded in the two-dimensional barcode 31. For example, a common-key cryptographic scheme can be used in which information is encrypted in advance, and then the encrypted information is encoded into the two-dimensional barcode 31 and printed on the card 2; the card 2 is read and decoded by the swipe-type image scanner 1 and the encrypted information is decrypted. Also, a public-key cryptographic scheme can be used in which information is encrypted by a public key of public-key encryption in advance and the encrypted information is encoded into the two-dimensional barcode 31; the two-dimensional barcode 31 is read and decoded by the swipe-type image scanner 1 and then the decoded information is decrypted. Further, a message authentication method can be used in which a message authentication code of the original information prior to the conversion to the two-dimensional barcode 31 is first created by common-key encryption, and the original information and the message authentication code are together encoded in the two-dimensional barcode 31; the two-dimensional barcode 31 is decoded, and then the message authentication code in the [decoded] information is verified for its authenticity. Furthermore, a method of digital signatures can be used in which a digital signature of the original information prior to the conversion to the two-dimensional barcode 31 is first created by public key encryption, and the original information and the digital signature are together encoded in the two-dimensional barcode 31; the two-dimensional barcode 31 is decoded, and then the digital signature in the decoded information is verified for its authenticity. An electronic watermark embedded system can be also used.

[Electrical Configuration]

Figure 2:
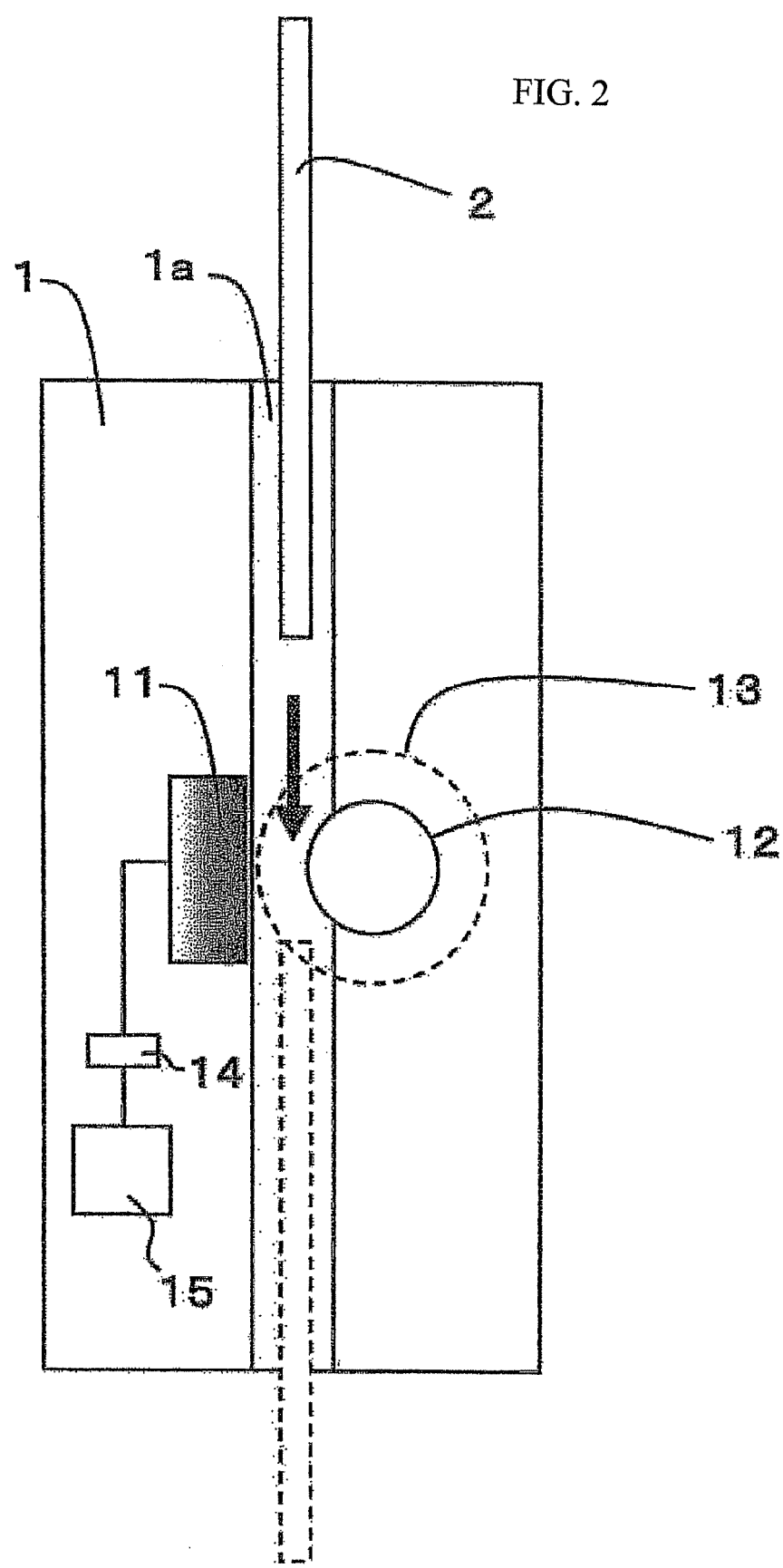
FIG. 2 is a diagram showing an electrical configuration of the swipe-type image scanner of one embodiment of the present invention.

FIG. 2 is a diagram showing the electrical configuration of the swipe-type image scanner 1 of the first embodiment of the present invention.

In FIG. 2, the swipe-type image scanner 1 comprises a close coupling image sensor 11, a pad roller 12 that makes contact with a card 2 and rotates when the card 2 passes through a card path 1a, an encoder 13 that senses the rotation of the pad roller 12 and obtains information about the position of the card 2. The image sensor 11 is electrically connected with an image memory 14 in which the imaged two-dimensional barcode 31 and/or the image data of the portrait 32 is stored, and the image memory 14 is electrically connected to an image processing means 15 which performs various processing on the image data retrieved from the image memory 14.

Based on the electrical configuration as described above, the operation of the swipe-type image scanner 1 is described.

First, the image sensor (image pickup device) 11 images the two-dimensional barcode 31 and the portrait 32 on the card 2 that passes through the card path 1a through photoelectric conversion. The image data of the imaged two-dimensional barcode 31 is stored in the image memory 14. Note that the image memory 14 can be of any type, RAM, SDRAM, DDRSDRAM or RDRAM as long as the image data can be stored. Then, the image processing means 15 reads the image data stored in the image memory 14 and performs signal processing such as a position detection processing, structure analysis processing, and decoding processing. In this manner, the reading of the two-dimensional barcode 31 is completed.

Also, the image data of the portrait 32 which is imaged by the image sensor 11 is first stored in the image memory 14 (it can be another type of memory), and then analyzed with various signal processing by the image processing means 15 (it can be another image processing means). Note that the method of extracting the visual characteristics of the portrait 32 may use various techniques such as minimum distance classifier, discrimination analysis, Bayes's decision boundary, Mahalanobis Distance Classification, a decision tree or a neural network.

As described above, according to the swipe-type image scanner 1 of this embodiment of the present invention, the two-dimensional barcode 31 and the visual characteristics of the portrait 32 can optically be read by a one-time swipe. Note that the present invention does not necessarily mean that the two-dimensional barcode 31 and the visual characteristics of the portrait 32 need to be read by a one-time swipe. For example, the two-dimensional barcode 31 may be read by the first swipe and the visual characteristics of the portrait 32 be read by the second swipe.

Further, as described above, since the visual characteristics of the portrait 32 are embedded in the two-dimensional barcode 31 on the card 2, forgery such as the replacement of the portrait can be prevented, resulting in improved security in the card verification.

In other words, since a two-dimensional barcode serves as the encoded information unit, in which the extracted information of the visual characteristics is encoded, and the visual characteristics of the portrait can be optically read altogether by a single reading operation, security and reliability of the information recording medium such as a card can be improved, and usability of the information recording medium can be increased.

[Modification Example of the First Embodiment]

Figure 3A:
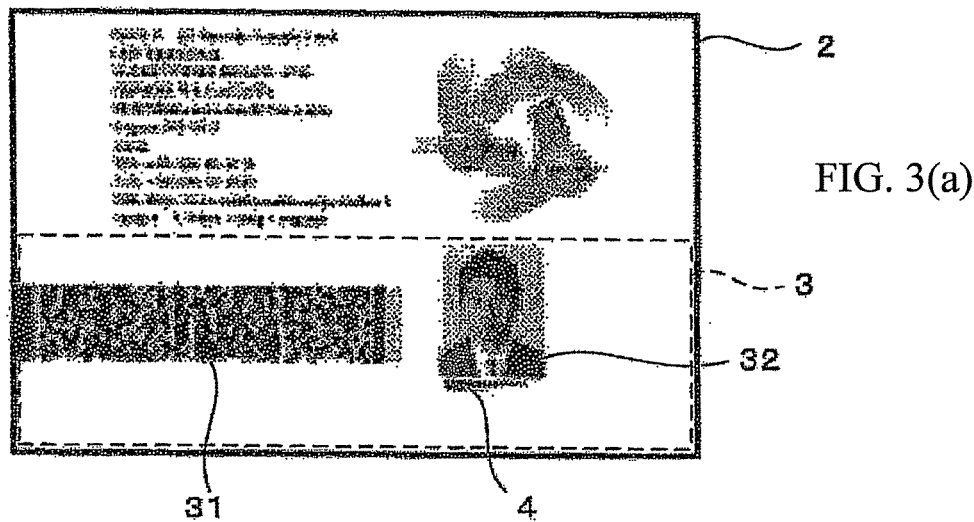
FIGS. 3(a), 3(b), and 3(c) are diagrams showing the configuration of a card of another embodiment of the present invention.
Figure 3B:
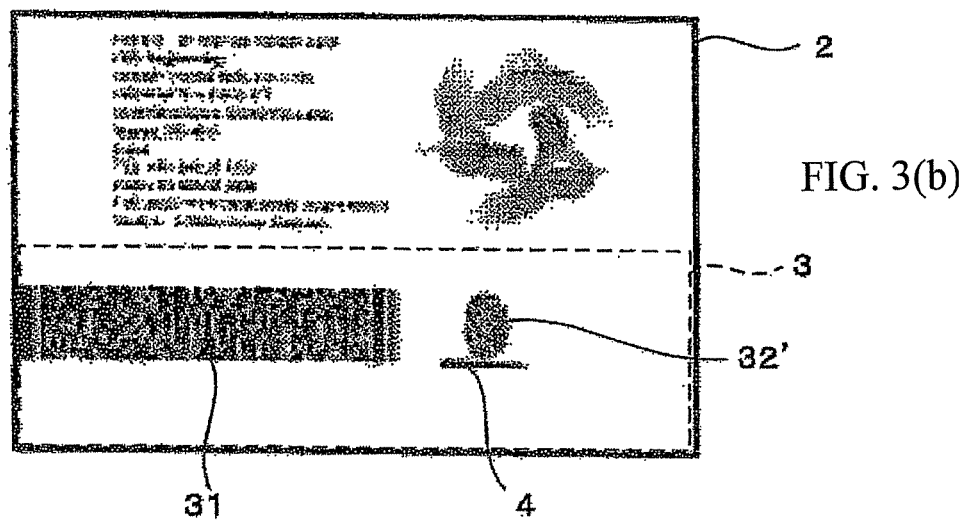
Figure 3C:
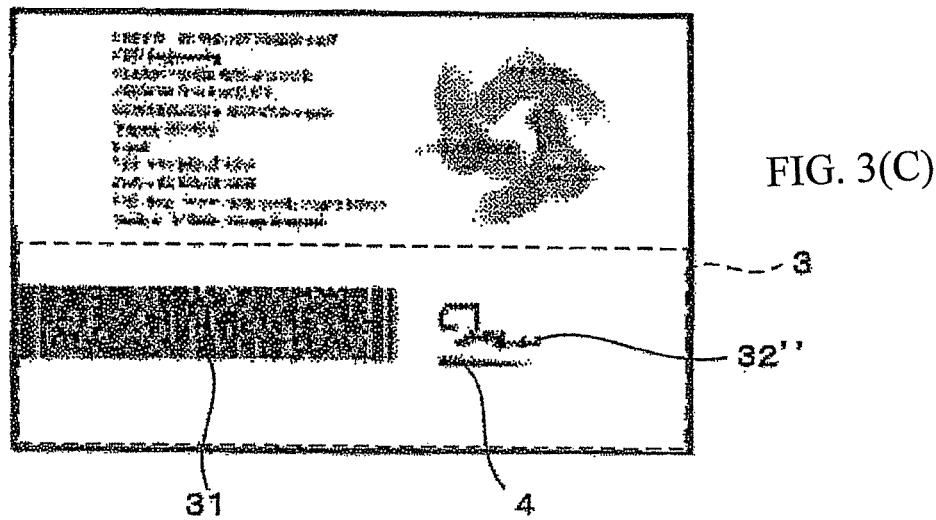

FIGS. 3(a), 3(b), and 3(c) are diagrams showing an exterior configuration of a card 2 of the modification example of the first embodiment of the present invention. Note that the same codes are given to the same components as in FIG. 1 (b).

In FIG. 3 (a), the card 2 of the modification example of the first embodiment of the present invention is featured by the fact that a triangle mark 4 is contained in the read area 3. It is provided to correct geometric distortion of the portrait 32 in the image processing means 15 of the swipe-type image scanner 1 (see FIG. 2).

More specifically described, since the human operation of holding and swiping the card 2 is interposed in the swipe-type image scanner 1, the card 2 does not always pass through the card path 1a at a constant speed. In such a case, jitter in the transporting direction is caused to the image data stored in the image memory 14 (see FIG. 2), distorting the facial image. The mark 4 contained in the read area 3 is used to correct the geometric distortion. The mechanism of the distortion correction by using the mark 3 is described referring to FIGS. 4(a) and 4(b).

Note that, although in FIG. 3 (a) the portrait 32 is used as one that contains visual characteristics of the holder of the card 2, the present invention is not limited to this. For example, as shown in FIG. 3 (b), a fingerprint 32' may be attached (or a fingerprint 32' is attached and coated with a transparent film), or as shown in FIG. 3 (c), a signature 32" may be attached (or a signature 32" is signed and coated with a transparent film).

In FIG. 3 (a), the triangle mark 4 is placed right under the portrait 32; however, the present invention is not limited to this positioning. It can be at any position as long as it is placed inside the read area 3 of the card 2. For example, it may be positioned adjacent to the two-dimensional barcode 31 or overlapping with the two-dimensional barcode 31. In particular, when positioned adjacent to the portrait 32 as shown in FIG. 3 (a), the mark 4 and the portrait 32 passes the front of the image sensor 11 at the same moving speed as the portrait 32 during the swipe; as a result, accuracy in correcting the image distortion caused by jitter in the transporting direction can be increased in the swipe-type image scanner 1.

Further, in FIG. 3 (a), the information in which the visual characteristics (such as perimeter and area of the triangle) of the mark 4 are encoded may be embedded in the two-dimensional barcode 31. In this way, even when the mark 4 is altered, the alteration can be properly detected, resulting in improved security and reliability of the card.

Figure 4A:
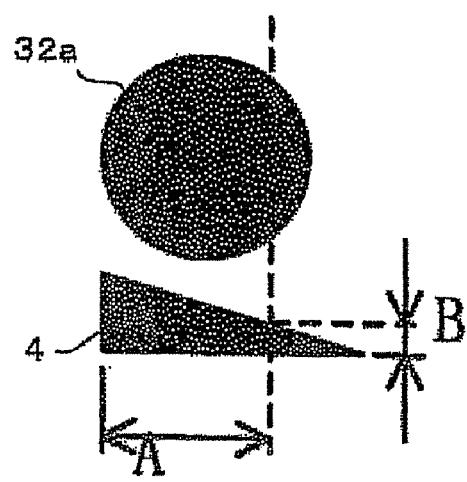
FIGS. 4(a) and 4(b) are explanatory illustrations showing the mechanism of distortion correction by using the image data of a mark in the swipe-type image scanner.
Figure 4B:
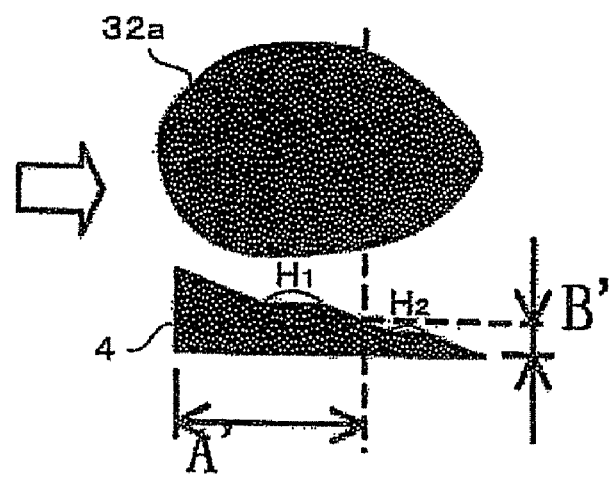

FIGS. 4(a) and 4(b) are an explanatory illustrations showing the mechanism of distortion correction by using the image data of the mark 4. FIG. 4(a) shows a circular portion 32a corresponding to an arbitrary portion of the portrait 32 and the mark 4 placed under the portrait 32.

A predetermined dimension of the mark 4 measured when no jitter in the transporting direction is caused to the image data in the image memory 14 (FIG. 4 (a)) is stored in advance in the swipe-type image scanner 1. For example, in FIG. 4 (a), the length of the mark 4 in the horizontal direction measured when its height is B (one or more values) is stored as A.

Assume that jitter in the transporting direction as shown in FIG. 4 (b) is caused to the image data stored in the image memory 14; more specifically, assume that the image data of the circular portion 32a is distorted in the transporting direction (in the horizontal direction in the figure) as well as the image data of the mark 4 is distorted in the transporting direction.

In this case, the length A' of the mark 4 in the horizontal direction measured when its height is B' (=B) is detected by the image processing means 15 of the swipe-type image scanner 1, and it is recognized that in the section of the length A' in the horizontal direction, the image data of the circular portion 32a and the mark 4 is distorted in the transporting direction at ratio of A'/A (that is, it is recognized that when the above-mentioned ratio of A'/A is 1, no jitter in the transporting direction was caused; when the ratio is any number other than 1, jitter in the transporting direction was caused).

In this manner, the height B' of the mark 4 is changed suitably to obtain a plurality of values of the length A' in the horizontal direction. Then, within the length A' that is distorted in the transporting direction, the section $H_1$ that is actually distorted can be specified. In the same manner, the section $H_2$ that is actually distorted can also be specified. Therefore, the image processing means 15 of the swipe-type image scanner 1 can correct the distortion based on such correction information (the distorted section or the distortion ratio).

According to this embodiment, in the information recording medium such as a card which is used with information reading devices, a mark to be used to correct the distortion caused when information is read by the information reading device is printed together with the two-dimensional barcode and the portrait in the read area on the information recording medium; therefore, even when geometric distortion (such as a distortion elongated in the transporting direction) is caused by the swiping of the medium to optically read information, the image distortion caused by jitter in the transporting direction can be corrected, based on the distortion correction information obtained by optically reading the mark.

Figure 5A:
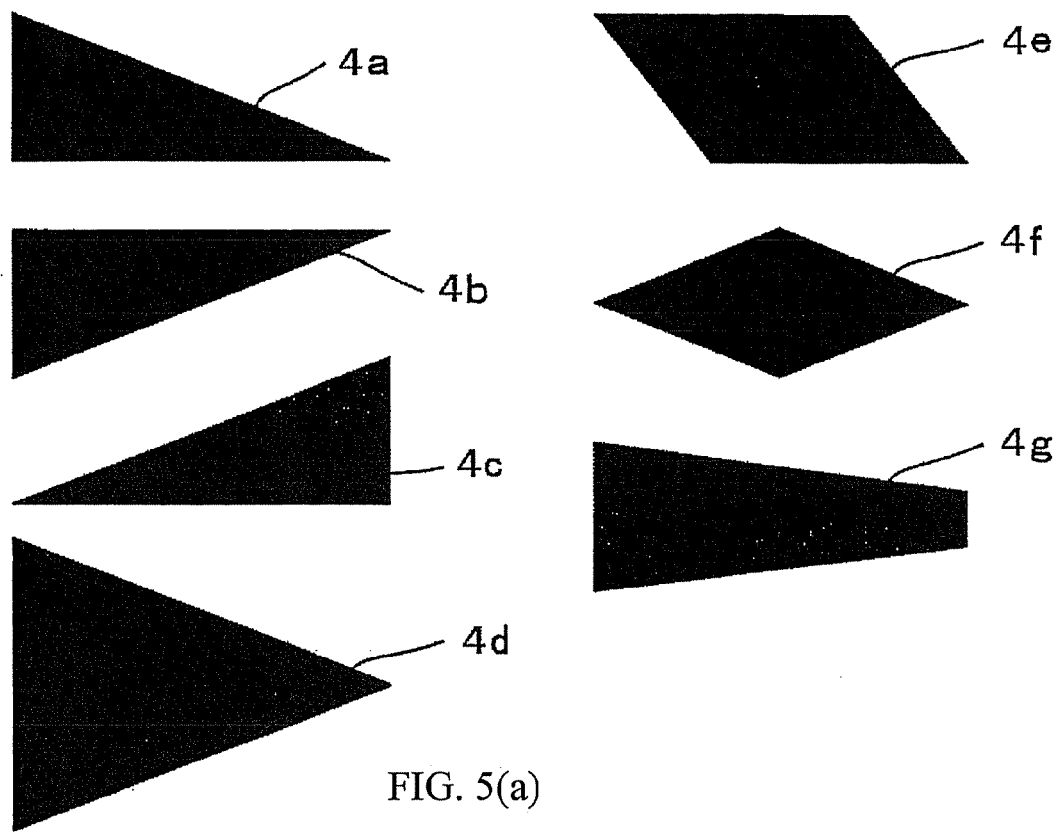
FIGS. 5(a) and 5(b) are explanatory illustrations showing different external appearances of the mark.
Figure 5B:
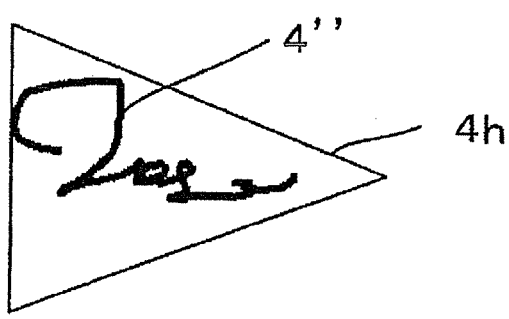

FIGS. 5(a) and 5(b) are an explanatory illustrations showing different appearances of the mark 4.

In FIG. 5 (a), the triangle mark 4a is the same figure as the mark 4 shown in FIG. 4 (a). Thus, the mark 4a is configured to have its width in the direction perpendicular to the transporting direction of the card 2 in the swipe-type image scanner 1 so that the distortion section can be specified as described referring to FIGS. 4(a) and 4(b).

Various kinds of figures can be used as the figure of the mark that has its width in the direction perpendicular to the transporting direction of the card 2 in the swipe-type image scanner 1. Referring to FIG. 5 (a), as shown by the mark 4b and the mark 4c, a mark may be configured as line symmetry of the mark 4a; as shown by the mark 4d, a mark may be configured as a combination of the mark 4a and the mark 4b; as shown by the mark 4e, the mark 4f, and the mark 4g, a mark may be configured as a parallelogram, a rhombus or a trapezoid. A mark may also be an outline (a square frame) of the portrait 32, a line portion contained in the portrait 32 or a combination of the line portion and another line provided together. Further, referring to FIG. 5 (b), as shown by the mark 4h, a mark may be a triangle figure surrounding the signature 4". It may also be a figure having overlapping patterns as long as they can be distinguished by contrast.

In order to increase accuracy (i.e., resolution) in distortion correction, the inclination with respect to the direction perpendicular to the card transporting direction in the mark 4 (marks 4a~4h) may be increased. For example, although the mark is a triangle figure that is long horizontally in FIG. 5 (a) or (b), it can be a triangle figure that is long vertically or a single vertical straight line. However, when the triangle mark 4 is formed with an inclination of 45 degree, it may not be laid out within the standard size of the card 2 (within the height of 54 mm, for example). Therefore, the mark 4 may be divided into several segments to form a figure.

Figure 6A:
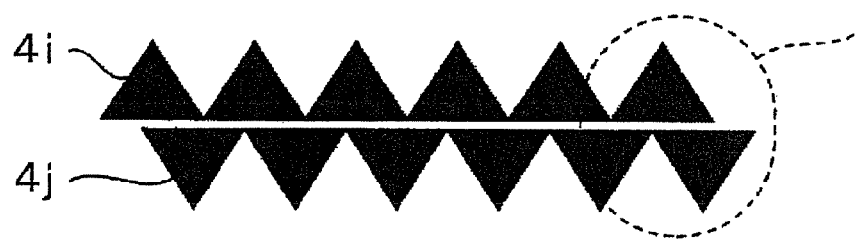
FIGS. 6(a), 6(b), and 6(c) are explanatory illustrations showing the correction processing when using a mark of a figure that is divided into several segments.
Figure 6B:
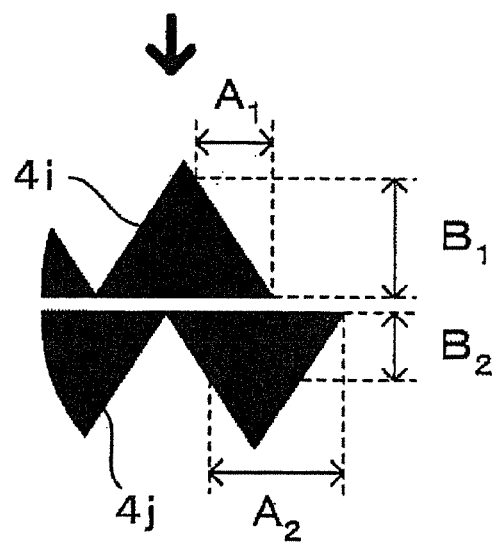
Figure 6C:
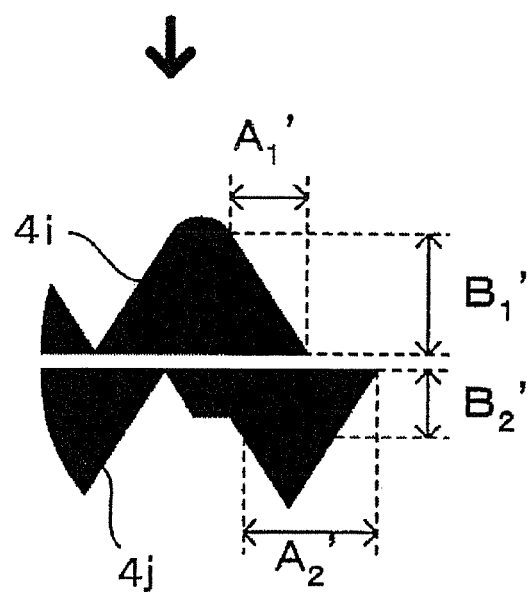

FIGS. 6(a), 6(b), and 6(c) are an explanatory illustrations showing a correction processing that uses the mark 4 in a figure in which the mark 4 is divided into several segments.

In FIG. 6(a), as shown by the mark 4i of FIG. 6 (a), the mark is divided into several segments maintaining an inclination of 45 degree to form a figure. In this way, the above-mentioned problem of layout can be solved, and while the height of the mark is controlled to some extent, accuracy in distortion correction can be increased.

Since the segmented mark 4i of FIG. 6 (a) is a figure in which monotonous increases and monotonous decreases are repeated, the change point (the point of each triangle shape) may be locally curved. Therefore, to reduce such distortion, the mark 4i and the mark 4j which is line symmetry of the mark 4i are combined and their position phases are shifted from each other in the transporting direction of the card 2. In this way, even if a portion of the figure of the mark 4i is not a straight line, the straight portion of the mark 4j corresponding to the non-linear portion of the mark 4i is used to accurately correct the distortion.

The detail of this distortion correction is described hereinafter. FIG. 6 (b) is an enlargement of the dotted line portion, X, of FIG. 6 (a). In the swipe-type image scanner 1, the predetermined dimensions of the mark 4i and mark 4j, which are measured when no jitter in the transporting direction is caused to the image data in the image memory 14 (FIG. 6 (b)), are stored in the image memory 14 in advance. For example, as in FIG. 6 (b), the lengths of the marks 4i and 4j in the horizontal direction which are measured when their heights are $B_1$ and $B_2$ are stored as $A_1$ and $A_2$. Then, assume that jitter in the transporting direction as shown in FIG. 6 (c) is caused to the image data stored in the image memory 14. At that time, the image processing means 15 detects the length $A_1'$ of the mark 4i in the horizontal direction which is obtained when its height is $B_1'$ (=B1) and the length $A_2'$ of the mark 4j in the horizontal direction which is obtained when its height is $B_2'$ (=B2).

Since the vertex of the triangle shape of the mark 4i is locally curved (see FIG. 6 (c)), it is difficult to specify the section of the distortion with the height $B_1'$ and the length $A_1'$ in the horizontal direction of the mark 4i. In other words, since the width of the mark 4i is not changed greatly with respect to the transporting direction in the area locally curved, resolution is deteriorated and the section of the distortion cannot be specified. To solve this problem, the mark 4j is used which is line symmetry of the mark 4i and whose position phase is shifted from that of the mark 4i. As shown in FIG. 6 (c), the mark 4i and the mark 4j are in such a positional relationship that, even when the mark 4i is locally curved, the mark 4j is not curved. Therefore, the height $B_2'$ and the length $A_2'$ in the horizontal direction of the mark 4j are used to accurately specify the section of the distortion can be accurately specified.

Note that distortion correction can be performed without using the mark 4, but by using a machine such as an encoder; however, such a method results in increased cost and space due to the use of a machine such as an encoder, which goes against the trend of downsizing. According to the distortion correction that is used in the present invention, a predetermined mark 4 is simply arranged on the card 2 so that the distortion caused by jitter in the transporting direction can be corrected, resulting in easy improvement of reliability of the swipe-type image scanner 1 and the card 2.

As described above, by simply providing a mark on the information recording medium by printing, etc. in advance, geometric distortion caused when the surface of the information recording medium is optically read can be easily corrected, and reading precision can be easily improved.

Second Embodiment

Configuration

Figure 7:
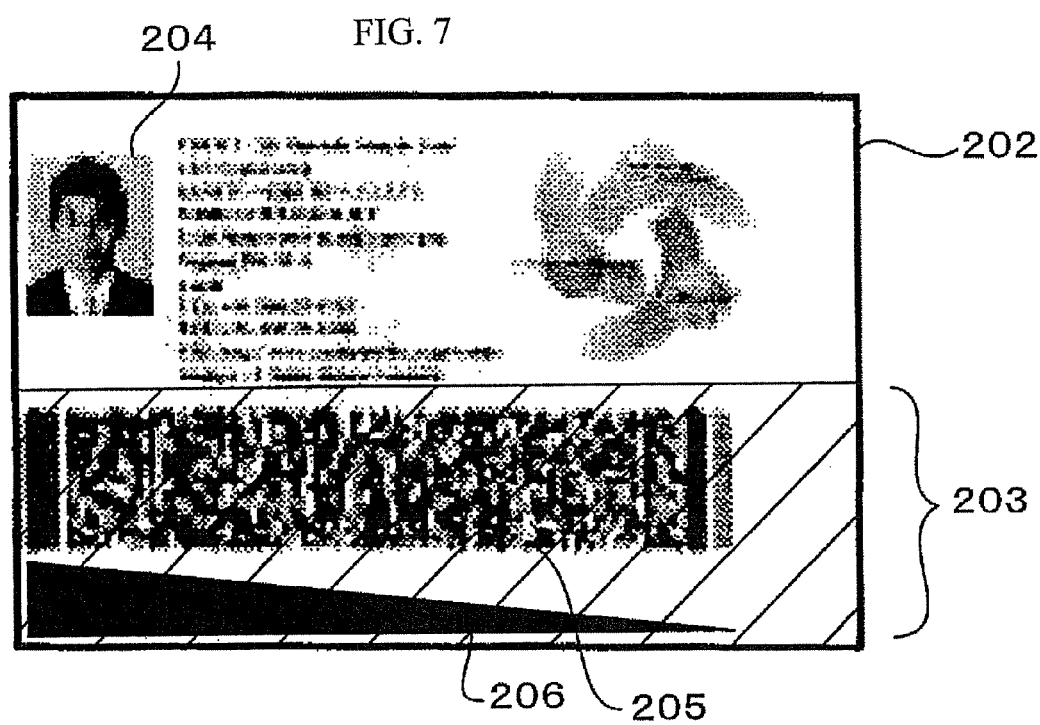
FIG. 7 is a diagram showing the configuration of a swipe-type image scanner and a card of one embodiment of the present invention.
Figure 8A:
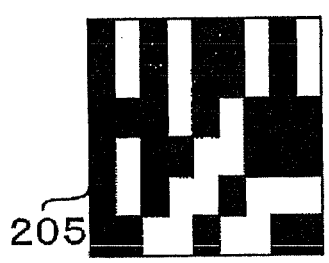
FIGS. 8(a) and 8(b) are explanatory illustrations showing the mechanism of distortion correction by using the image data of a mark in the swipe-type image scanner.
Figure 8A:
Figure 8B:
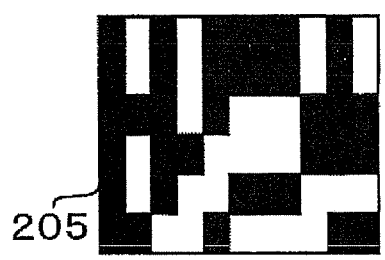
Figure 8B:
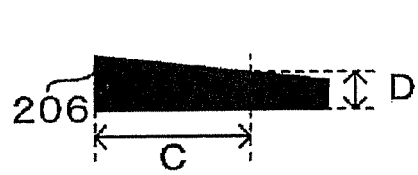
Figure 8B:
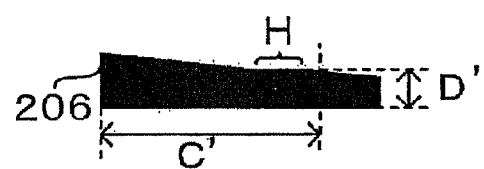

The second embodiment of the present invention is described next. As shown in FIG. 7, the second embodiment is different from the first embodiment in that a barcode 205 and a mark 206 are arranged parallel in the direction the card 202 is transported. The card 202 is the same normal JIS-based plastic card as that in the first embodiment; however, various kinds of information recording media such as a booklet like a passport, any card having the size of a credit card, name card, or boarding pass, can be used.

Note that since the exterior appearance and electrical configuration of the swipe-type (manual-type) image scanner 201 and the card 202 of the second embodiment are the same as those of the first embodiment (see FIGS. 1 (a) and 1(b), and FIG. 2), the description thereof is omitted.

The card 202 has a read area 203 (the oblique lines in the figure) from which information is read by the swipe-type image scanner 1, and the read area 203 includes a two-dimensional barcode 205 that contains the encoded information of the holder of the card 202 and a mark 206 printed under the two-dimensional barcode. The mark 206 is used, when geometric distortion is caused when the surface of the card 202 is optically read, to correct the distortion (see [Correction Processing] that is described later). A portrait 204 is attached in the area (left upper corner of the card 202) other than the read area 203.

Note that the two-dimensional barcode 205 has the same configuration as that of the first embodiment.

Described hereinafter is a correction processing performed by the swipe-type image scanner 1 which uses the mark 206 on the card.

[Correction Processing]

FIG. 8 is an explanatory illustration showing the mechanism of the distortion correction processing in the swipe-type image scanner 1 by using image data of the mark 206. FIG. 8 illustrates the two-dimensional barcode 205 (only around the center) and the mark 206 (only around the center) printed under the two-dimensional barcode 205.

First, the two-dimensional barcode 205 and the mark 206 are read. More specifically described, the image sensor (e.g., an image pickup device) 11 images the two-dimensional barcode and the mark 206 on the card 202, which passes through the card path 1a (see FIGS. 1(a) and 1(b)), through photoelectric conversion. The image data of the imaged two-dimensional barcode 205 and the mark 206 is stored in the image memory 14 (see FIG. 2). At this point, the reading of the two-dimensional barcode 205 and the mark 206 is completed.

Next, correction processing is performed by using the mark 206. More specifically, the image processing means 15 (see FIG. 2) reads the image data of the two-dimensional barcode 205 and the mark 206 stored in the image memory 14 (see FIG. 2).

Here, a predetermined dimension of the mark 206, which is measured when no jitter in the transporting direction is caused to the image data of the two-dimensional barcode 205 and the mark 206 (FIG. 8 (a)), is stored in the image memory 14 in advance (see FIG. 2). For example, in FIG. 8 (a), the length of the mark 206 in the horizontal direction which is measured when the height is B (one or more values) is stored as A.

Then, assume that jitter in the transporting direction (i.e., in the horizontal direction in the figure) is caused to the image data of the two-dimensional barcode 205 and the mark 206 obtained through the above-mentioned reading processing. In other words, as shown in FIG. 8 (b), assume that the image data of the two-dimensional barcode 205 as well as the image data of the mark 206 is distorted by being stretched by the length of the section, H.

At the same time, the image processing means 15 (see FIG. 2) detects the length C' of the mark 206 in the horizontal direction, which is obtained when the height is D' (=D), and recognizes that the image data of the two-dimensional barcode 205 and the mark 206 is distorted at the ratio of C'/C in the section of the length C' in the horizontal direction (when the ratio of C'/C is 1, there is no jitter caused in the transporting direction; when the ratio is any number other than 1, jitter in the transporting direction is caused).

In the same manner, the value of the height D' of the mark 206 is suitably changed so that a plurality of values for the length C' in the horizontal direction are obtained. Consequently, the section, H, which is actually distorted, can be specified within the length C' that contains distortion in the transporting direction, and only the specified section, H, in the transporting direction is reduced to correct the geometric distortion. In this manner, the image processing means (see FIG. 2) of the swipe-type image scanner 201 performs the correction processing using the mark 206 so that the geometric distortion caused when the surface of the card 202 is optically read can be corrected. Note that signal processing such as position detection, structural analysis, and decoding is performed with respect to the two-dimensional barcode 205 after the correction so that the information of the two-dimensional barcode 205 can be accurately read; thus, reading accuracy is easily improved.

When the mark 206 is printed adjacently under the two-dimensional barcode 205 (see FIG. 7), the mark 206 and the two-dimensional barcode 205 pass the front of the image sensor 11 (see FIG. 2) at the same time during the swiping. Consequently accuracy in correcting the image distortion caused by jitter in the transporting direction is improved in the swipe-type image scanner 201.

Figure 9A:
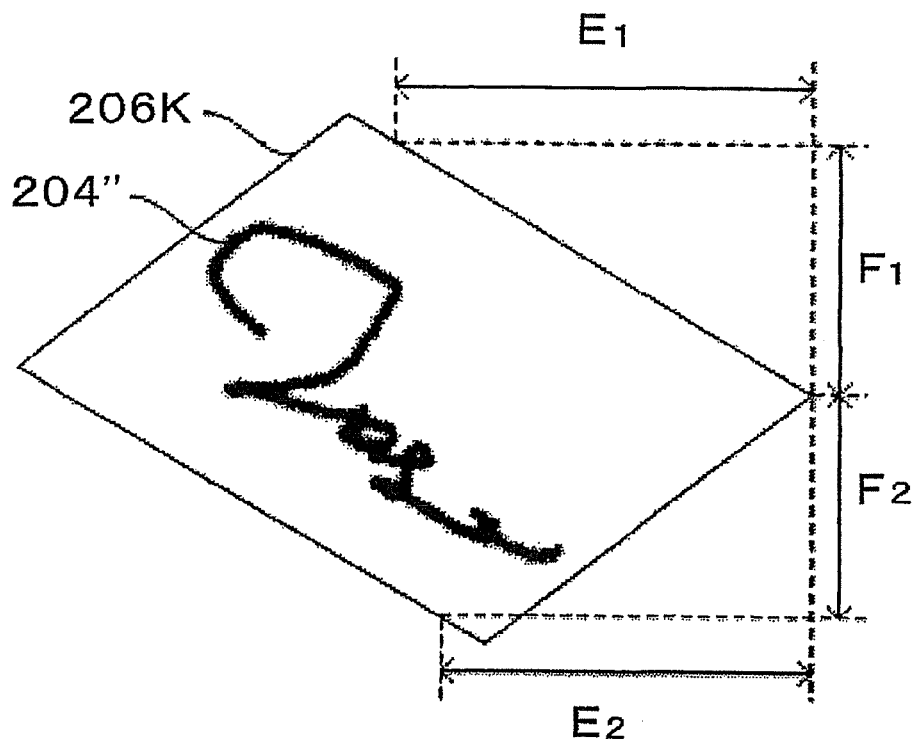
FIGS. 9(a) and 9(b) are explanatory illustrations showing a mark composed of a parallelogram frame arranged around the signature.
Figure 9B:
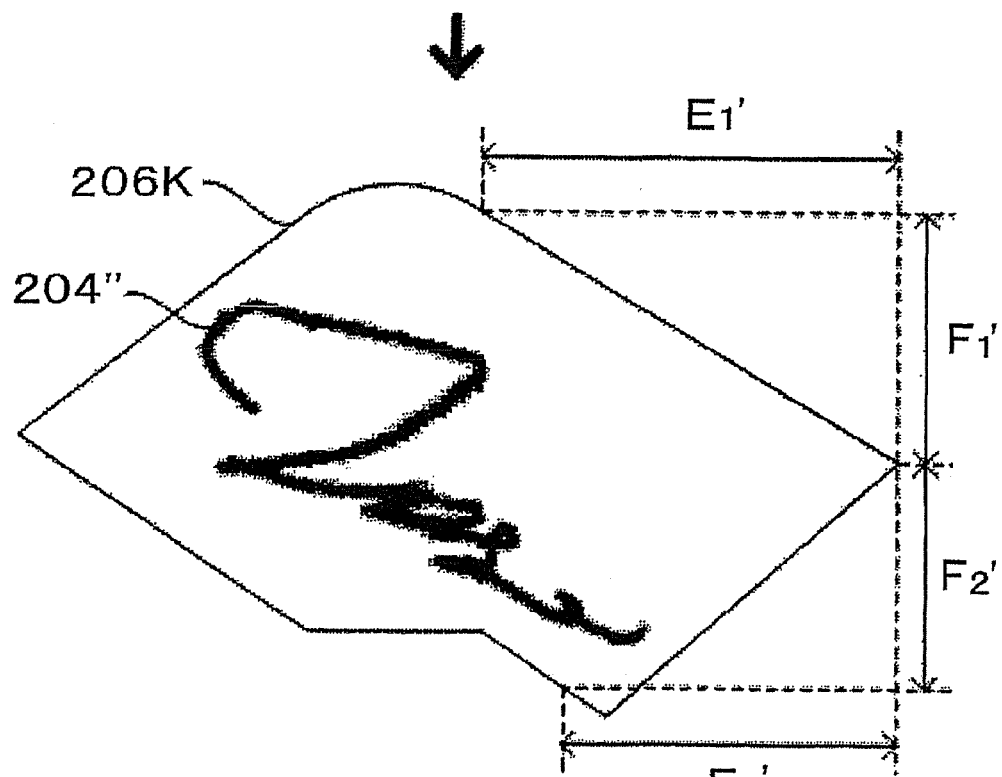

Another embodiment is described next. This embodiment is to correct a distorted signature with a mark, the signature being the characteristic unit that contains visual characteristics of the holder of the information recording medium. FIGS. 9(a) and 9(b) is an explanatory illustration showing that a mark 206k composed of a parallelogram frame is provided to a signature 204" on a card as the information recording medium.

With the mark 206k shown in FIGS. 9(a) and 9(b), the same correction processing as the distortion correction as described referring to FIGS. 6(a), 6(b), and 6(c) can be performed. More specifically described, predetermined dimensions ($E_1$, $E_2$, $F_1$, $F_2$) of the mark 206k are stored in the image memory 14 (see FIG. 2) in advance (FIG. 9 (a)); even if jitter in the transporting direction is caused as shown by FIG. 9 (b), the distortion can be corrected by using the dimensions ($E_2'$, $F_2'$) with which it is possible to specify the section of the distortion because the section of the dimensions is not locally curved, not by using the dimensions ($E_1'$, $F_1'$) with which it is difficult to specify the section of the distortion due to a local curve.

Figure 10A:
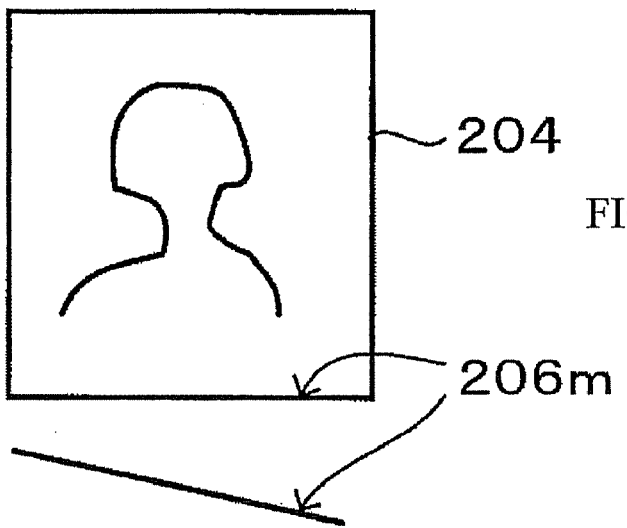
FIGS. 10(a), 10(b), and 10(c) explanatory illustrations showing a mark arranged adjacent to or inside the portrait.
Figure 10B:
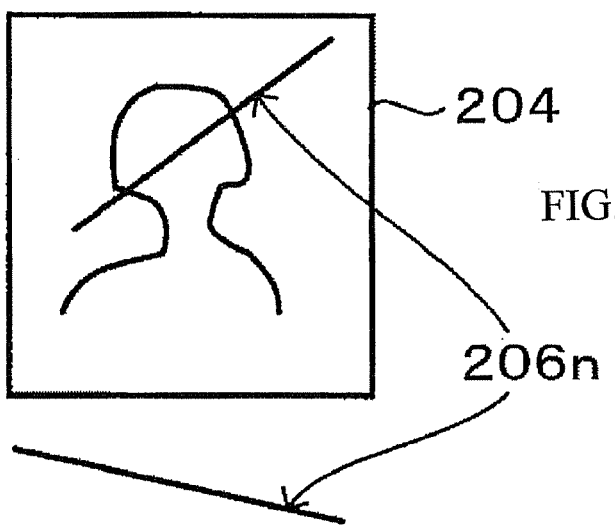
Figure 10C:
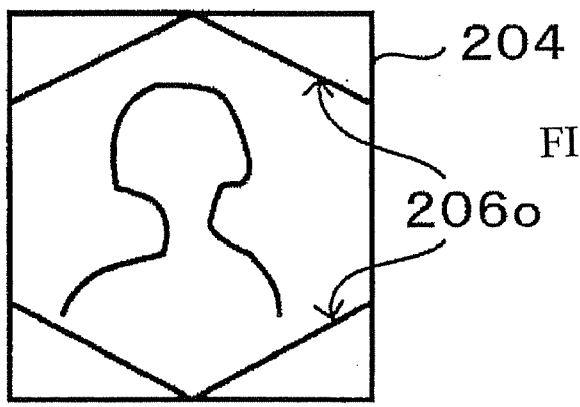

Further, another embodiment is described. This embodiment is to correct a distorted portrait by using a mark, the portrait being the characteristic unit that contains visual characteristics of the holder of the information recording medium. FIGS. 10(a), 10(b), and 10(c) is an explanatory illustration showing that the mark 206m, the mark 206n or the 206o is arranged adjacent to or inside the portrait 204 on the card 2 which is an information recording medium.

With the mark 206m through the mark 206o shown in FIG. 10 (a) through FIG. 10 (c), the image distortion caused by jitter in the transporting direction can be corrected in the same manner as the above-mentioned correction processing. In particular, according to the mark 206m or the mark 206n, one figure is embedded on the frame of the portrait 204 (FIG. 10 (a)) or embedded inside the portrait 204 (FIG. 10 (b)); therefore, the other figure can simply be a straight line. As a result, the space for arranging the mark can be minimized. According to the mark 206o, the mark is embedded inside the portrait 204, surrounding the image of a person (FIG. 10 (c)); therefore, the mark 206o cannot be easily recognized as a figure used to correct the distortion. Consequently, any awkwardness caused by arranging the mark 206o in the read area 203 of the card 2 can be eliminated.

As the method of detecting distortion by using a mark, this embodiment uses a method in which the image obtained when there is no distortion is studied in advance; however, the present invention is not limited to this. For example, if a presupposition is established that the width of the mark is varied linearly, it is understood that the transporting speed of the medium is changed in the section in which the straight line is distorted. In other words, when a figure is used in which the width of the mark is linearly varied, the correction on the speed change can be performed by correcting the transporting speed for the section in which the linearity is distorted.

Figure 11:
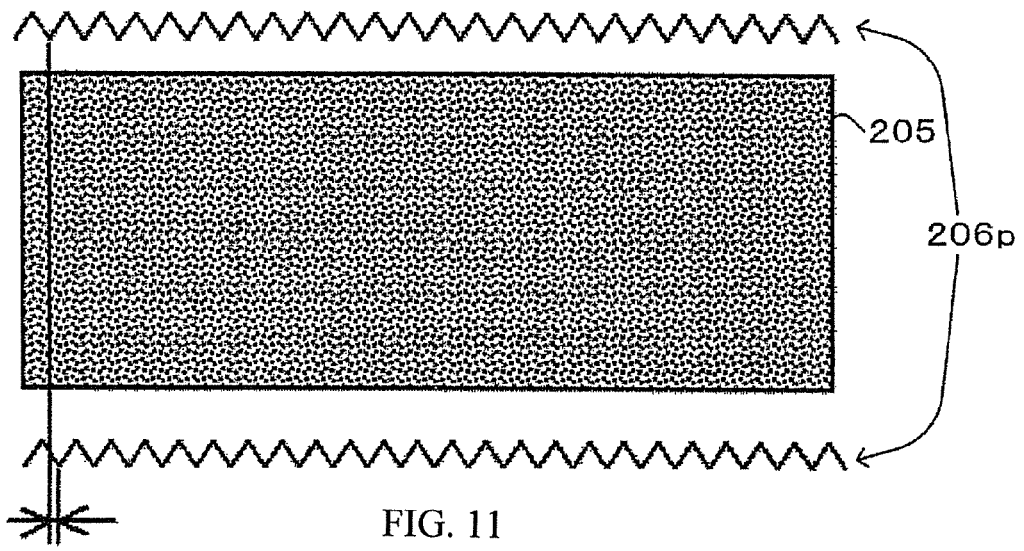
FIG. 11 is an explanatory illustration showing how to detect a skew caused when a two-dimensional barcode is read.
Figure 12:
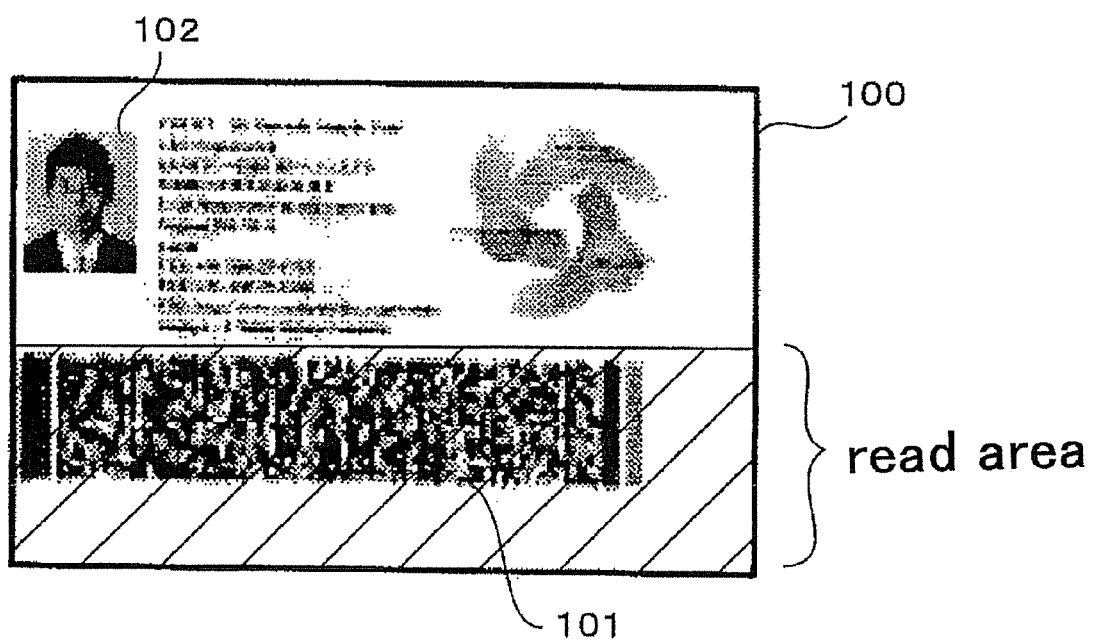
FIG. 12 is a diagram of a conventional example of a card.

According to at least an embodiment of the present invention, a skew in a two-dimensional barcode can be detected by using a mark. The embodiment of this kind is described next. FIG. 11 is an explanatory illustration showing that a skew caused during the reading of the two-dimensional barcode 5 is detected.

In FIG. 11, with the mark 206p, a skew caused during the reading the two-dimensional barcode 205 can be detected without having the mark stand out. More specifically described, wavy lines (mark 206p) are provided at the top and bottom of the two-dimensional barcode 205 so that the change in the amount of shift of the peak positions of the mark 206p can be detected; therefore, when the amount of shift of the peak positions changes, a skew can be detected. For example, when the first phase shift is 90 degrees, the phase shift becomes 70 degrees or 100 degrees with the presence of skew.

Also, a mark is not necessary in devices in which the transporting speed of the card is maintained to be constant. The devices in which the transporting speed is maintained to be constant include a two-dimensional image sensor, flat bed scanner, etc. However, as described above, a mark may be provided for emergency cases of inconsistent transporting speed even in such information reading devices.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An information recording medium identifying a holder and used with an information reading device, the information recording medium comprising:
    a read area from which information is read by said information reading device, said read area comprising:
        an encoded information unit which contains encoded information of the holder of said information recording medium;
        a characteristic unit which contains visual characteristics of the holder of said information recording medium; and
        a mark unit which has a mark structured to be read by the information reading device to correct geometric distortion caused when the visual characteristics in said characteristic unit are optically read.

2. The information recording medium as set forth in claim 1 wherein said encoded information unit contains encoded information from which said visual characteristics contained in said characteristic unit are extracted.

3. The information recording medium as set forth in claim 1 wherein said mark unit is adjacent to said characteristic unit.

4. The information recording medium as set forth in claim 1 wherein said encoded information unit contains information in which the extracted information of the visual characteristics of said characteristic unit and the extracted information of the characteristics of said mark unit is encoded.

5. The information recording medium as set forth in claim 1 wherein said mark unit has its width in a direction perpendicular to a transporting direction of said information recording medium in said information reading device, and wherein the mark unit is in a figure in which said width is varied along said transporting direction.

6. The information recording medium as set forth in claim 5 wherein said figure is arranged as multiple figures along the direction perpendicular to the transporting direction of said information recording medium in said information reading device, and position phases of said multiple figures are shifted from each other in the transporting direction of said information reading medium in said information reading device.

7. The information recording medium as set forth in claim 1 wherein said encoded information unit is encrypted.

8. The information recording medium of claim 1 wherein said encoded information unit and said characteristic unit are read by the information reading device in a single reading operation.

9. The information recording medium as set forth in claim 8 wherein said mark is read by said reading operation.

10. A combination information recording medium and information reading device, wherein
    the information recording medium comprises:
        a read area from which information is read by said information reading device, said read area comprising:
            an encoded information unit which contains encoded information of the holder of said information recording medium;
            a characteristic unit which contains visual characteristics of the holder of said information recording medium;
            a mark unit which has a mark structured to be read by the information reading device to correct geometric distortion caused when the visual characteristics in said characteristic unit are optically read; and said information reading device comprises a reading means structured to read information recorded on said information recording medium, wherein the information reading device is structured such that information from the information recording medium is read when the information recording medium is moved relative to the information reading device in a transporting direction; and the information reading device is structured to correct image distortion caused by jitter in the transporting direction of the information recording medium.

11. The combination information recording medium and information reading device as set forth in claim 10, wherein the information reading device further comprises:

a frame that forms a travel path;

wherein a portion of said frame is formed as a travel reference plane along which said information recording medium is swiped to read information.

12. An information recording medium identifying a holder and used with an information reading device by moving the information recording medium relative to the information reading device in a transporting direction, the information recording medium comprising:

a read area from which information is read by said information reading device, said read area comprising:

a mark structured to be read by the information reading device to correct geometric distortion with said information reading device;

wherein a width of the mark varies with respect to the transporting direction of the information recording medium.

13. The information recording medium as set forth in claim 12 wherein said mark has a width in a direction perpendicular to a transporting direction of said information recording medium in said information reading device, and said mark is in a figure in which said width is varied with respect to said transporting direction.

14. The information recording medium as set forth in claim 12 wherein said mark comprises a plurality of figures which are arranged parallel to the direction perpendicular to the transporting direction of said information recording medium in said information reading device, and position phases of the plurality of figures are shifted from each other in the transporting direction of said information recording medium in said information reading device.

15. The information recording medium as set forth in claim 12 wherein said read area includes an encoded information unit that contains encoded information of the holder of said information recording medium, and said mark is arranged adjacent to or inside said encoded characteristic unit.

16. The information recording medium as set forth in claim 12 wherein said read area includes a characteristic unit that contains visual characteristics of the holder of said information recording medium, and said mark is arranged adjacent to or inside said characteristic unit.

17. An information reading device to which an information recording medium is moved relatively in a transporting direction and the information recording medium having a mark to correct geometric distortion, the information reading device comprising:

a distortion correcting means that corrects geometric distortion based on the mark provided on said information recording medium.

18. The information reading device as set forth in claim 17 having a frame that forms a travel path, wherein a portion of said frame is formed as a travel reference plane along which an information recording medium is swiped to read information.

19. The information reading device as set forth in claim 17, wherein the information reading device is structured to read information from an encoded information unit and a characteristic unit on the information recording medium in a single reading operation.

* * * * *